US011185800B2

(12) United States Patent
Chatterjee et al.

(10) Patent No.: US 11,185,800 B2
(45) Date of Patent: Nov. 30, 2021

(54) APPARATUS AND METHOD FOR FILTERING AQUEOUS LIQUID

(71) Applicant: Conopco, Inc., Englewood Cliffs, NJ (US)

(72) Inventors: Debosree Chatterjee, Bangalore (IN); Ganesan Rajendiran, Bangalore (IN); Jayashree Anantharam Vadhyar, Bangalore (IN); Deepak Venkatesh, Bangalore (IN)

(73) Assignee: Conopco, Inc., Englewood Cliffs, NJ (US)

( * ) Notice: Subject to any disclaimer, the term of this patent is extended or adjusted under 35 U.S.C. 154(b) by 32 days.

(21) Appl. No.: 16/637,457

(22) PCT Filed: Aug. 13, 2018

(86) PCT No.: PCT/EP2018/071921
§ 371 (c)(1),
(2) Date: Feb. 7, 2020

(87) PCT Pub. No.: WO2019/034607
PCT Pub. Date: Feb. 21, 2019

(65) Prior Publication Data
US 2020/0391138 A1    Dec. 17, 2020

(30) Foreign Application Priority Data

Aug. 15, 2017    (EP) .................................. 17186246

(51) Int. Cl.
*B01D 24/16*    (2006.01)
*B01D 24/40*    (2006.01)
(Continued)

(52) U.S. Cl.
CPC ........... *B01D 24/165* (2013.01); *B01D 24/40* (2013.01); *B01D 24/4694* (2013.01);
(Continued)

(58) Field of Classification Search
CPC .. B01D 24/165; B01D 24/40; B01D 24/4694; B01D 24/48; B01D 39/06; B01D 24/46;
(Continued)

(56) References Cited

U.S. PATENT DOCUMENTS 1,984,219 A    12/1934  Krogh-Lund
2,316,660 A *  4/1943  Bailey .................. E04B 1/6806
                                                        52/274
(Continued)

FOREIGN PATENT DOCUMENTS

CN    103285661    9/2013
CN    203884469    10/2014
(Continued)

OTHER PUBLICATIONS

Woroszynska; Chemistry for the Proection of the Environment; Removal of Sulphates from Tap Water by Precipitation or Crystallization of Ettryngite; 1996; 193-201; 51.
(Continued)

*Primary Examiner* — Joseph W Drodge
(74) *Attorney, Agent, or Firm* — Greenberg Traurig, LLP

(57) ABSTRACT

The invention relates to an apparatus for the filtration of aqueous liquid that is capable of effectively removing suspended particles from aqueous liquid during a prolonged period of time without clogging of the particulate filter media and associated pressure build-up. This filtration apparatus comprises: •a filtration chamber comprising an inlet opening that is located near the bottom of the filtration chamber, and an outlet opening that is located near the top of the filtration chamber; •a screen covering the outlet opening of the filtration chamber; •a first dosing unit that is located upstream of the filtration chamber adapted to release water-soluble components into the stream of aqueous liquid that flows from the inlet to the filtration chamber; •a par- (Continued)

Figure 1:
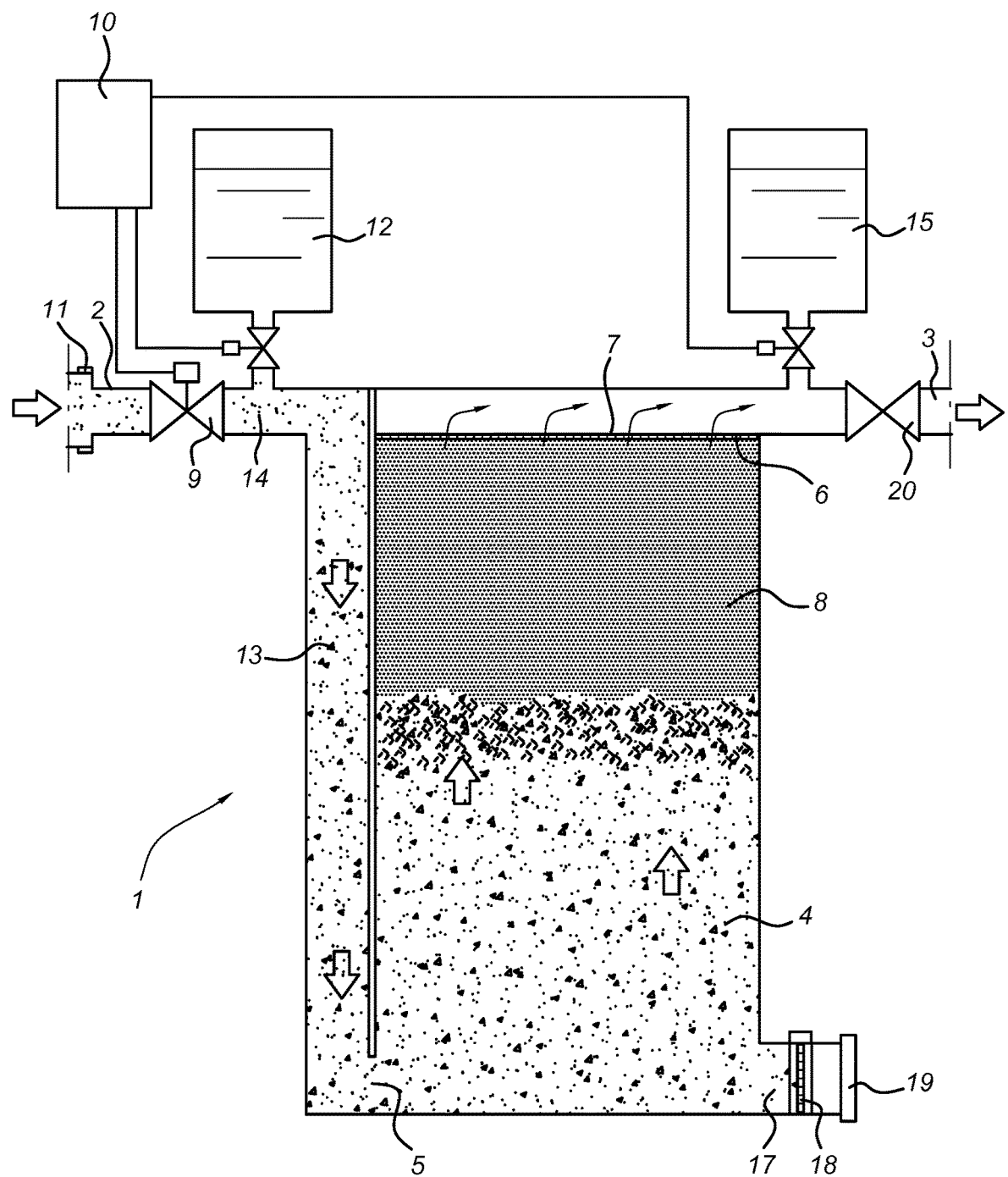

ticulate filter media that partially fills the interior of the filtration chamber; •a flow regulator that regulates the flow rate of aqueous liquid through the filtration chamber and that can operate in a high flow rate mode or a reduced flow rate mode; •a timer that controls the flow regulator; wherein the timer is programmed to alternatingly switch the flow regulator from the high flow rate mode to the reduced flow rate mode.

12 Claims, 2 Drawing Sheets

(51) Int. Cl.
| | |
|---|---|
| *B01D 24/46* | (2006.01) |
| *B01D 24/48* | (2006.01) |
| *B01D 39/06* | (2006.01) |
| *B01J 20/16* | (2006.01) |
| *B01J 20/28* | (2006.01) |
| *C02F 9/00* | (2006.01) |
| *C02F 1/00* | (2006.01) |
| *C02F 1/68* | (2006.01) |
| *C02F 5/08* | (2006.01) |
| *C02F 101/10* | (2006.01) |

(52) U.S. Cl.
CPC .............. *B01D 24/48* (2013.01); *B01D 39/06* (2013.01); *B01J 20/165* (2013.01); *B01J 20/28004* (2013.01); *B01J 20/28011* (2013.01); *B01J 20/28016* (2013.01); *C02F 9/00* (2013.01); *C02F 1/004* (2013.01); *C02F 1/685* (2013.01); *C02F 5/083* (2013.01); *C02F 2101/10* (2013.01); *C02F 2209/40* (2013.01)

(58) Field of Classification Search
CPC ............... B01D 24/16; B01D 21/0039; B01D 21/0042; B01D 21/0066; B01D 21/08; B01D 21/24; B01D 21/2405; B01D 21/2444; B01D 21/28; B01D 21/30; B01D 21/34; B01D 21/16; B01D 21/165; B01D 21/26; B01D 21/263; B01D 21/38; B01D 21/40; B01D 21/405; B01D 21/42; B01D 21/46; B01D 21/4694; B01D 21/48; B01D 35/157; B01D 35/1573; B01D 35/30; B01D 36/00; B01D 36/04; B01D 24/26; B01D 24/263; B01D 26/38; B01D 26/40; B01D 26/405; B01D 26/42; B01D 26/46; B01D 26/4694; B01D 26/48; B01J 20/165; B01J 20/28004; B01J 20/28011; B01J 20/28016; C02F 9/00; C02F 1/004; C02F 1/685; C02F 5/083; C02F 2101/10; C02F 2209/40; C02F 1/008; C02F 1/28; C02F 1/281; C02F 1/52; C02F 1/5209; C02F 1/5227; C02F 1/5236; C02F 1/5281; C02F 1/58; C02F 1/68; C02F 2209/44; C02F 2201/005

See application file for complete search history.

(56) References Cited

U.S. PATENT DOCUMENTS

| | | | |
|---|---|---|---|
| 3,869,381 A | 3/1975 | Graveland et al. | |
| 4,246,119 A | 1/1981 | Alldredge | |
| 4,290,894 A | 9/1981 | Torek et al. | |
| 4,322,296 A | 3/1982 | Fan et al. | |
| 4,378,295 A | 3/1983 | Axtmann et al. | |
| 4,624,789 A | 11/1986 | Fan et al. | |
| 4,693,831 A * | 9/1987 | Garzonetti | B01D 24/4869 210/744 |
| 5,180,491 A * | 1/1993 | Polasky | B01D 39/16 210/282 |
| 5,198,002 A | 3/1993 | Mei et al. | |
| 5,620,607 A | 4/1997 | Bowie, Jr. | |
| 5,643,444 A | 7/1997 | Garrigues et al. | |
| 5,779,996 A * | 7/1998 | Stormo | B01F 5/0218 422/227 |
| 6,110,389 A | 8/2000 | Horowitz | |
| 2002/0074292 A1* | 6/2002 | Schlegel | C01G 49/0045 210/681 |
| 2003/0168401 A1* | 9/2003 | Koslow | C02F 1/444 210/500.25 |
| 2005/0029204 A1* | 2/2005 | Schwartzkopf | B01D 24/4636 210/793 |
| 2009/0045135 A1* | 2/2009 | Khudenko | C02F 1/004 210/631 |
| 2010/0133196 A1* | 6/2010 | Khudenko | B01D 24/06 210/668 |
| 2014/0291224 A1 | 2/2014 | Fujita et al. | |
| 2019/0046901 A1* | 2/2019 | Boyd | B01D 24/167 |
| 2019/0194035 A1* | 6/2019 | Mackay Pett | B01D 29/68 |

FOREIGN PATENT DOCUMENTS

| | | |
|---|---|---|
| DE | 2365248 | 8/1974 |
| DE | 29920728 | 2/2000 |
| EP | 0214577 | 3/1987 |
| EP | 0100994 | 4/1987 |
| EP | 0279975 | 8/1988 |
| EP | 0355886 | 7/1989 |
| EP | 0434484 | 3/1993 |
| EP | 2070574 | 6/2009 |
| JP | 2004074133 | 8/2002 |
| JP | 2017113723 | 6/2017 |
| WO | WO9214535 | 9/1992 |

OTHER PUBLICATIONS

Mahvi; International Journal of Environmental Science and Technology; Feasibility study of crystallization process for water softening in a pellet reactor; 2005; 301-305; 1, No. 4.
Graveland; American Water Works Association; Developments in water softening by means of pellet reactors; Dec. 1983; 619-625; 75, No. 12.
Van Der Bruggen; Journal of Environmental Management; Cost-benefit analysis of central softening for production of drinking water; 2009; 541-549; 91, No. 2.
Van Schagen; Journal of Water Supply and Technology—Aqua; Dynamic modelling for optimisation of pellet softening; 2008; 45-56; 57, No. 2.
Written Opinion in PCTEP2018071921; dated Jul. 5, 2019.
Search Report and Written Opinion in EP17186245; dated Feb. 16, 2018.
Search Report and Written Opinion in EP17186246; dated Feb. 16, 2018.
Search Report and Written Opinion for PCTEP2018071975.pdf; dated Nov. 6, 2018.
Written Opinion in PCTEP2018071975; dated Jul. 26, 2019.
Search Report and Written Opinion in PCTEP2018071921; dated Oct. 19, 2018.

* cited by examiner

APPARATUS AND METHOD FOR FILTERING AQUEOUS LIQUID

RELATED APPLICATIONS

This application is a national phase filing under 35 USC 371 of International Application No. PCT/EP2018/071921, filed on Aug. 13, 2018, which claims priority from European Patent Application No. 17186246.9 filed, Aug. 15, 2017, the contents of which are incorporated herein in their entirety for all purposes.

FIELD OF THE INVENTION

The present invention relates to an apparatus for filtering aqueous liquid, which apparatus comprises a filtration chamber that holds a particulate filter media that is composed of inorganic material. The apparatus according to the invention is capable of effectively removing suspended particles from aqueous liquid during a prolonged period of time without clogging of the particulate filter media and associated pressure build-up. The apparatus of the present invention is particularly suitable for clarifying source water before that water is used for washing laundry or dishes.

The invention further relates to a method of filtering aqueous liquid by passing a stream of aqueous liquid through a filtration chamber that is partially filled with particulate filter media.

BACKGROUND OF THE INVENTION

Water is one of the necessities of human life. Water is important for drinking, cooking food and for preparing beverages. Water is also very important for cleaning items used in the household like clothes, utensils and surfaces, e.g floors and table tops. Further, a large amount of water is used for personal cleaning in the bathrooms and toilets. The quality of water required for each of the above is different.

There are billions of people, especially in the underdeveloped and developing countries, especially in the rural areas, who do not have purified water piped to their homes.

Modern day urban households receive water from large lakes through a network of pipes, while in some rural areas villagers fetch water directly from sources like wells, lakes, rivers and bore wells. Water directly taken from such surface and underground sources are generally more impure as compared to piped water which has been treated by the municipality.

Water from such sources is usually turbid and impure and hampers cleaning performance of detergents and personal care products and hence needs to be clarified before use.

Several types of water purification systems are known and available. They can be broadly classified into thermal, radiation, chemical and physical methods of purification or a combination of one or more of these methods.

Filtration is a well-known physical method for removing suspended particles from water. Depth filters, i.e. filters that use a porous filtration medium to retain particles throughout the medium, are widely used to filter water. Depth filters offer the advantage that they are able to retain a high quantity of particles without compromising the separation efficiency and that they can be operated at high filtration rates.

U.S. Pat. No. 6,110,389 describes an apparatus for purification of water, the apparatus Comprising:
  a filter chamber;
  a water inlet through which unpurified water enters the chamber;
  a water outlet through which purified water exits the chamber;
  a filter system including:
    a first filtration screen disposed within the chamber adjacent the water inlet,
    a second filtration screen disposed within the chamber adjacent the water outlet, and
    filtration media trapped between the first and second screens, the water inlet, water outlet, and first and second filtration screens configured such that unpurified water entering the tank through the water inlet passes through the first filtration screen, the filtration media and the second filtration screen before exiting the tank through the water outlet;
  a source of cleaning liquid connected with the chamber for selectively supplying cleaning liquid to the chamber to clean the filtration media;
  a drain outlet for selectively draining water from the chamber, the drain outlet sized for rapidly draining the tank to clean the filter system; and
  at least one nozzle which selectively directs the cleaning liquid into the chamber wherein the at least one nozzle includes a plurality of spaced nozzles.

EP-A 2 070 574 describes a device for filtering liquid, said device comprising a filter chamber with an inlet and an outlet, said filter chamber comprising particulate filter media, wherein the flow of the liquid through the filter chamber is in a direction that is opposite to the direction in which the particulate filter media moves through said liquid due to a density difference.

SUMMARY OF THE INVENTION

The inventors have designed an apparatus for the filtration of aqueous liquid that is capable of effectively removing suspended particles from aqueous liquid during a prolonged period of time without clogging of the particulate filter media and associated pressure build-up.

The apparatus of the present invention employs a depth filter that is made up of particles of inorganic material having a mass weighted average particle size between 100 and 900 µm and having a specific gravity of 2-3 g/ml. The apparatus comprises a filtration chamber that is only partially filled with the particulate filter media; a flow regulator that regulates the flow rate of aqueous liquid through the filtration chamber; and a timer that controls the flow regulator.

The filtration apparatus of the present invention is designed to be alternatingly operated in a high flow rate mode and a reduced flow rate mode. In the high flow rate mode a stream of aqueous liquid flows through the filtration chamber in an upward direction with a flow rate that is sufficiently high to cause the formation of a filter bed of particulate filter media against a screen that is located at the upper end of the filtration chamber. In the reduced flow rate mode, the flow rate of the stream of aqueous liquid is reduced (or the flow is stopped) so as to cause the filter bed of particulate filter media to break up and travel downwards. The timer ensures that the apparatus switches from high flow rate mode to reduced flow rate mode before the filter bed can become clogged. By interrupting long periods of high flow rate mode by short periods of reduced flow rate mode it can be ensured that the filtration efficacy of the apparatus can be maintained for very long periods of time.

Although the inventors do not wish to be bound by theory, it is believed that the breaking up of the filter bed during the reduced flow rate mode destroys the filter cake that is formed on the surface of the filter bed and promotes disintegration of particles of particulate filter media that have become clogged together.

Accordingly, the invention provides an apparatus for filtering aqueous liquid, said apparatus comprising:
- an inlet for a stream of aqueous liquid;
- an outlet for a stream of aqueous liquid;
- a filtration chamber comprising an inlet opening that is in fluid communication with the inlet for the stream of aqueous liquid and an outlet opening that is in fluid communication with the outlet for the stream of aqueous liquid;
- a screen covering the outlet opening of the filtration chamber;
- a particulate filter media that partially fills the interior of the filtration chamber, said particulate filter media being composed of inorganic material having a mass weighted average particle size between 100 and 900 microns, and having a specific gravity of 2-3 g/ml;
- a flow regulator that regulates the flow rate of aqueous liquid through the filtration chamber and that can operate in a high flow rate mode or a reduced flow rate mode;
- a timer that controls the flow regulator;

wherein the timer is programmed to alternatingly switch the flow regulator from the high flow rate mode to the reduced flow rate mode after the time period measured by the timer reaches a first predetermined time period $t_1$ that is in the range of 30-3000 seconds and from the reduced flow rate mode to the high flow rate mode after time period measured by the timer reaches a second predetermined time period $t_2$ that is in the range of 1-10 seconds.

Furthermore, the invention provides a method of filtering aqueous liquid, said method comprising an alternating sequence of the following steps a) and b):
- a) during a time interval $t_1$, passing a stream of aqueous liquid with a high flow rate in upward direction through a filtration chamber that is partially filled with particulate filter media, said stream entering the filtration chamber through an opening near the bottom of the filtration chamber and leaving the filtration chamber near the top of the filtration chamber through an opening that is covered by a screen;
  - said high flow rate causing the formation of a filter bed of particulate filter media against the screen;
  - said filter bed taking up 10-80% of the internal volume of the filtration chamber;
  - said particulate filter media being composed of inorganic material having a mass weighted average particle size between 100 and 900 microns, and having a specific gravity of 2-3 g/ml;
- b) during a time interval $t_2$, reducing the flow rate of the stream of aqueous liquid to a sufficiently low flow rate to cause the filter bed of particulate filter media to break up and move from the screen towards the bottom of the filtration chamber;
- wherein the time interval $t_1$ is in the range of 30-3000 seconds, the time interval $t_2$ is in the range of 1-10 seconds.

FIGURES

FIG. 1 provides a cross-sectional view of a filtration apparatus according to the present invention, operated in high flow rate mode.

Figure 2:
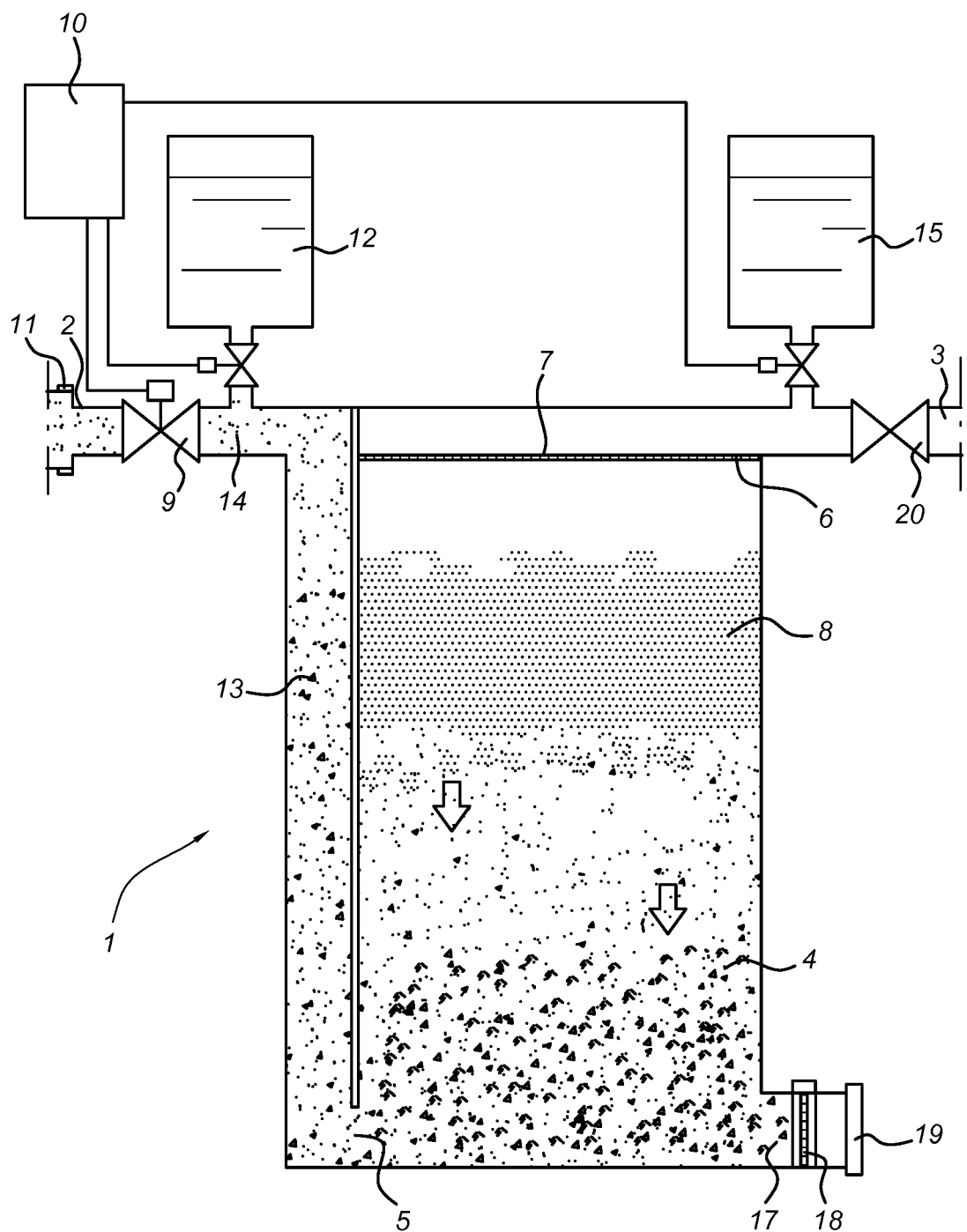

FIG. 2 provides a cross-sectional view of a filtration apparatus according to the present invention, operated in reduced flow rate mode.

DETAILED DESCRIPTION OF THE INVENTION

Accordingly, a first embodiment of the present invention relates to an apparatus (1) for filtering aqueous liquid, said apparatus (1) comprising:
- an inlet for a stream of aqueous liquid (2);
- an outlet for a stream of aqueous liquid (3);
- a filtration chamber (4) comprising an inlet opening (5) that is located near the bottom of the filtration chamber and that is in fluid communication with the inlet for the stream of aqueous liquid (2), and an outlet opening (6) that is located near the top of the filtration chamber (4) and that is in fluid communication with the outlet for the stream of aqueous liquid (3);
- a screen (7) covering the outlet opening (6) of the filtration chamber (4);
- a particulate filter media (8) that partially fills the interior of the filtration chamber, said particulate filter media (8) being composed of inorganic material, having a mass weighted average particle size between 100 and 900 microns, and having a specific gravity of 2-3 g/ml;
- a flow regulator (9) that regulates the flow rate of aqueous liquid through the filtration chamber and that can operate in a high flow rate mode or a reduced flow rate mode;
- a timer (10) that controls the flow regulator (9);

wherein the timer (10) is programmed to alternatingly switch the flow regulator (9) from the high flow rate mode to the reduced flow rate mode after the time period measured by the timer (10) reaches a first predetermined time period $t_1$ that is in the range of 30-3000 seconds and from the reduced flow rate mode to the high flow rate mode after time period measured by the timer (10) reaches a second predetermined time period $t_2$ that is in the range of 1-10 seconds.

In operation, the aqueous liquid that is to be filtered enters the apparatus (1) through the inlet (2), passes through the inlet opening (5) to enter the filtration chamber (4) and flows through the filtration chamber (4) in an upwards direction, passing through the screen (7) when leaving the filtration chamber (4) and exiting the apparatus (1) through the outlet (3).

The timer (10) that controls the flow regulator (9) can be a mechanical timer or an electronic timer. Preferably, said timer (10) is an electronic timer, more preferably an electronic timer that can be connected to a power source.

The flow regulator (9) that regulates the flow rate of aqueous liquid through the filtration chamber (4) and that can operate in a high flow rate mode or a reduced flow rate mode, preferably is a valve, more preferably a valve that is electronically connected to and controlled by the timer (10).

The flow rate of aqueous liquid through the filtration chamber (4) when the flow regulator (9) is in reduced flow rate mode typically does not exceed 50%, more preferably does not exceed 30% of the flow rate of the aqueous liquid through the filtration chamber (4) when the flow regulator is in high flow rate mode.

It is an essential element of the present invention that the filtration chamber (4) of the apparatus is only partially filled with the particulate filter media (8). Preferably, the particulate filter media (8) fills 10-80%, more preferably 20-70% and most preferably 30-60% of the internal volume of the filtration chamber (4) when it is allowed to form a bed under the influence of gravity.

The particulate filter media (8) that is employed in accordance with the present invention preferably is composed of relatively large particles as this minimizes undesired clogging. The particulate filter media (8) that is contained in the filtration chamber preferably has a mass weighted average particle size between 150 and 700 microns, more preferably between 200 and 600 microns.

The specific gravity of the particulate filter media (8) preferably lies in the range of 2.2-2.9 g/ml.

The particulate filter media (8) that is employed in accordance with the present invention preferably comprises at least 50 wt. %, more preferably at least 80 wt. % and most preferably at least 90 wt. % of inorganic material selected from aluminosilicates, silica, calcium carbonate, magnesium carbonate and combinations thereof. The inventors have found that these inorganic materials aid the formation of calcium carbonate particles, thereby contributing to the effective softening of the aqueous liquid in case a calcium sequestrant such as sodium carbonate is added shortly before the liquid enters the filtration chamber.

In accordance with a particularly preferred embodiment, the particulate filter media (8) contains at least 50 wt. %, more preferably at least 80 wt. % and most preferably at least 90 wt. % aluminosilicates.

The mesh size of the screen (7) should be sufficiently small to retain the particulate filter media (8) inside the filtration chamber (7). At the same time, the mesh size should be sufficiently large to allow the aqueous liquid to pass the screen (7) without difficulty. Preferably, the mesh size of the screen (7) is in the range of 30 to 200 microns, more preferably in the range of 40 to 150 microns and most preferably in the range of 50 to 100 microns.

In a preferred embodiment, the filtration chamber (4) contains yet another screen that covers the opening (5) of the filtration chamber (4). This additional screen should prevent particulate filter media (8) from leaving the filtration chamber (4), especially in case of backflush.

The filtration chamber (4) of the apparatus (1) typically contains 0.025-0.5 kg of the particulate filter media (8). More preferably, the amount of filter media (8) in the filtration chamber (4) is 0.05-0.2 kg The filtration chamber (4) preferably has an internal volume of 0.05-5L, more preferably of 0.075-2.5 L and most preferably of 0.1-1 L.

The present apparatus (1) is particularly suited for use in households. The apparatus (1) can suitably be used to filter source water as well as greywater.

The filtration chamber (4) of the present apparatus (1) preferably comprises a drain opening (17) that is located near the bottom of the filtration chamber (4). Flow through this drain opening (17) may be regulated by a drain valve.

According to a preferred embodiment, the drain opening comprises a removable third screen (18) that, like the screen (7), is designed to keep the particulate filter media (8) inside the filtration chamber (4). The presence of this screen (18) makes it possible to clean the particulate filter media (8) by rinsing it with aqueous liquid to remove entrained (small) particles.

In another preferred embodiment the screen (18) is removably attached to the filtration chamber (4) and can be detached by a user so as to enable easy replacement of filter media (8).

According to a particularly preferred embodiment, the filtration apparatus (1) comprises coupling means (11) for attaching the apparatus (1) to a water tap so that tap water can enter the apparatus (1) through the inlet (2) of the apparatus (1).

According to a particularly preferred embodiment of the present invention, the apparatus (1) comprises a first dosing unit (12) that is located upstream of the filtration chamber (4) and that is adapted to release water-soluble components into the stream of aqueous liquid that flows from the inlet (2) to the filtration chamber (4). This first dosing unit (12) may suitable be used to introduce a calcium sequestrant into the aqueous stream that rapidly forms particles of water-insoluble calcium complex (e.g. water insoluble calcium salt) that are subsequently removed from the aqueous stream in the filtration chamber (4). Typical examples of such a calcium sequestrants are sodium carbonate, potassium carbonate and combinations thereof.

The first dosing unit (12) is preferably controlled by the timer (10). Even more preferably, the timer (10) is programmed to control the first dosing unit (12) by alternatingly switching the first dosing unit (12) from a high dosing rate mode to a low dosing rate mode, wherein the high dosing rate mode coincides with the high flow rate mode of the flow regulator (9) and the low dosing rate mode coincides the low flow rate mode of the flow regulator (9).

According to another preferred embodiment, the apparatus (1) comprises a second dosing unit (15) that is located downstream of the filtration chamber and that is adapted to release water-soluble components into the stream of aqueous liquid that flows from the filtration chamber (4) to the outlet (3). Examples of water-soluble components that may suitably be introduced into the aqueous stream from this second dosing unit (15) include acidulants, fragrances, silicones, bactericide and combinations thereof.

Also the second dosing unit (15) is preferably controlled by the timer (10). More particularly, the timer (10) is programmed to control the second dosing unit (15) by alternatingly switching the second dosing unit (15) from a high dosing rate mode to a low dosing rate mode, wherein the high dosing rate mode coincides with the high flow rate mode of the flow regulator (9) and the low dosing rate mode coincides the low flow rate mode of the flow regulator (9).

In accordance with a particularly preferred embodiment, the first dosing unit (12) is adapted to release sodium carbonate and/or potassium carbonate and the second dosing unit is adapted to release acidulent (15). This arrangement offers the advantage that the pH of the filtered aqueous liquid can be kept near neutral pH.

The filter apparatus (1) of the present invention is particularly suited for use in a filtering method as described hereinafter.

Another embodiment of the present invention relates to a method of filtering aqueous liquid, said method comprising an alternating sequence of the following steps a) and b):

a. during a time interval $t_1$, passing a stream of aqueous liquid with a high flow rate in upward direction through a filtration chamber (4) that is partially filled with particulate filter media (8), said stream entering the filtration chamber (4) through an opening (5) near the bottom of the filtration chamber (4) and leaving the filtration chamber (4) near the top of the filtration chamber through an opening (6) that is covered by a screen(7); said high flow rate causing the formation of a filter bed of particulate filter media (8) against the screen (7);

said filter bed taking up 10-80% of the internal volume of the filtration chamber (4);

said particulate filter media (8) being composed of inorganic material having a mass weighted average particle size between 100 and 900 microns, and having a specific gravity of 2-3 g/ml;

b. during a time interval $t_2$, reducing the flow rate of the stream of aqueous liquid to a sufficiently low flow rate to cause the filter bed of particulate filter media (8) to break up and move from the screen towards the bottom of the filtration chamber (4);

wherein the time interval $t_1$ is in the range of 30-3000 seconds, the time interval $t_2$ is in the range of 1-10 seconds.

In accordance with a particularly preferred embodiment, the present method comprises passing the aqueous liquid through an apparatus (1) as defined herein before.

The present method preferably comprises the addition of a sequestering agent that forms a water insoluble complex with $Ca^{2+}$ to the stream of aqueous liquid water before the stream reaches the filter bed of particulate filter media (8). This sequestering agent is preferably selected from sodium carbonate, potassium carbonate and combinations thereof. Said sequestering agent is preferably added to the stream of aqueous liquid in a concentration of 0.1-3 g/L, most preferably in a concentration of 0.5-2 g/L.

The high flow rate employed in step a) of the present method preferably exceeds 0.3 cm/s, more preferably it exceeds 0.5 cm/s and most preferably it exceeds 0.7 cm/s.

The reduced flow rate employed in step b) typically does not exceed 50%, more preferably does not exceed 30% of the high flow rate that is employed in step a).

Preferably, the reduced flow rate in step is in the range of 0-0.9 cm/s, more preferably of 0-0.6 cm/s and most preferably in the range of 0-0.3 cm/s.

The particulate filter media (8) that is employed in the present method preferably is a particulate filter media as defined herein before.

The benefits of the present method are particularly appreciated if the time interval $t_1$ during which a high flow rate is employed is considerably longer than the time $t_2$ during the reduced flow rate is employed. Accordingly, in a preferred the ratio of $t_1 : t_2$ is at least 10:1, more preferably at least 60:1.

The time interval $t_2$ typically does not exceed 15 seconds. More preferably this time interval does not exceed 10 seconds, most preferably it does not exceed 5 seconds.

In a preferred embodiment, the present method comprises repeating the sequence of steps a) and b) at least 3 times. More preferably, this sequence is repeated at least 3 times, each time employing the same time interval $t_1$ and the same time interval $t_2$.

FIG. 1 provides a cross-sectional view of a filtration apparatus (1) according to the present invention, operated in high flow rate mode. The aqueous liquid to be filtered contains suspended soil particles (14) and dissolved calcium. The aqueous liquid is introduced into the apparatus (1) through inlet (2), enters the filtration chamber (4) near the bottom via inlet opening (5) and leaves the filtration chamber (4) via outlet opening (6) that is covered by screen (7). The timer (10) is connected to a power source and electronically connected to the flow regulator (9). The timer (10) has switched the flow regulator (9) to the high flow rate mode. The aqueous liquid that enters the filtration chamber (4) at a high flow rate pushes the particulate filter media (8) in the filtration chamber (4) against the screen (7), thereby forming a filter bed. Suspended particles that are contained in the aqueous liquid are retained by the filter bed of filter media (8). The filtered aqueous liquid that exits the filter chamber (4) via opening (6) leaves the apparatus (1) via outlet (3).

Further shown in FIG. 1 are the coupling means (11) that can be used to secure the inlet (2) to a water tap. A dosing unit (12) is located between the flow regulator (9) and the filter chamber (4). The dosing unit (12) contains an aqueous solution of sodium carbonate and is electronically connected to the timer (10). During the high flow rate mode the dosing unit (12) introduces the aqueous solution of sodium carbonate at a constant rate into the stream of aqueous liquid. Downstream of the dosing unit (12) particles of calcium carbonate (13) are formed. These calcium carbonate particles (13) as well as suspended soil particles (14) are removed by the filter bed of filter media (8). Downstream of the filtration chamber (4) another dosing unit (15) is provided. This dosing unit (15) contains an aqueous solution acidulent and is electronically connected to the timer (10). During the high flow rate mode the dosing unit (15) introduces the aqueous solution of acidulent at a constant rate into the stream of filtered and softened aqueous liquid before the liquid leaves the apparatus (1) via outlet (3).

The opening (17) near the bottom of the filtration chamber (4) is covered by a screen (18) and closed off by a cap (19). The cap (19) can be removed so that the filter media (8) may be rinsed with a stream of aqueous liquid whilst the valve (20) in the outlet (3) is closed. Alternatively, the filter media (8) may be rinsed with a stream of aqueous liquid that is introduced through outlet (3) whilst keeping the flow regulator (9) closed. Also the screen (18) can be removed to enable removal of the filter media (8) from the filtration chamber (4).

FIG. 2 provides a cross-sectional view of the filtration apparatus operated in reduced flow rate mode. This time the timer (10) has switched the flow regulator (9) to the reduced flow rate mode and no aqueous liquid is introduced into the apparatus (1) through inlet (2). Furthermore, no sodium carbonate solution is related from the dosing unit (12) and no acidulent solution is released from dosing unit (15). The particulate filter media (8) in the filtration chamber (4) that formed a filter bed against screen (7) when the apparatus was operated in high flow rate mode is travelling downward towards the bottom of the filtration chamber (4).

The invention is further illustrated by the following non-limiting examples.

EXAMPLES

Example 1

An apparatus as shown in FIG. 1 was used to filter and soften source water. However, no acidulent solution was added to the filtered and softened water.

The source water used had a turbidity of 15 NTU, and a hardness of 70 FH with a molar ratio of Ca: Mg of 2:1.

During the high flow rate mode, the source water passed through the apparatus at a flow rate of 4 L/min.

The aqueous sodium carbonate solution that was used to soften the source water had a sodium carbonate content of 200 g/L. During the high flow rate interval sodium carbonate solution was added to achieve a concentration of 1 g/L in the aqueous stream.

The filtration chamber had the shape of a standing cylinder with an internal volume 0.350 L and an inner diameter of 4 cm. The filtration chamber contained 250 g of particulate filter media. This filter media consisted of Feldspar having the following particle size distribution:

$D_{10}$ 150 microns
$D_{50}$ 320 microns
$D_{90}$ 520 microns

During operation, the timer continuously switched the flow regulator from high flow rate to no flow after 4 minutes of high flow rate and vice versa after 4 seconds of no flow. During the no flow time interval no sodium carbonate was added from the dosing unit.

The source water was filtered and softened in this manner during a period of 40 minutes. The filtered and softened stream of aqueous liquid that left the apparatus during this period had a turbidity of less than 2 NTU and a calcium content that had been reduced by more than 80%. Pressure drop across the filter increased only slightly during this period.

COMPARATIVE EXAMPLE

Example 1 was repeated, except that the apparatus was continuously operated in high flow rate mode for 40 minutes. A very substantial increase in pressure drop across the filter was observed during this period.

Comparative Example 2

Effect of bed material

Crystallization involves nucleation of a "seed" crystal and subsequent growth of that crystal. Nucleation involves competition between the supersaturation driving crystallization and the surface energy created by formation of a new phase. For this reason, high supersaturations (a large driving force) promotes nucleation. In contrast, once nuclei exist, they may grow at smaller supersaturations. It is well known in the field of crystallization and precipitation, if a seed is provided in a supersaturated solution, precipitation occurs on the surface of the seed. This facilitates and hastens the process of precipitation. In the current invention, it is observed that alumina silicates like feldspar acts like a seed material. However, synthetic spongy, foam materials like polystyrene gel are unable to facilitate this process.

| TYPE OF PARTICLE IN COLUMN | PARTICLE SIZE, MM | WATER FLOW RATE, LPM | INPUT WATER CALCIUM HARDNESS, FH | OUTPUT WATER CALCIUM HARDNESS, FH | % CALCIUM REMOVAL | % INTERNAL VOLUME OF COLUMN FILLED WITH PARTICLES | SOURCE WATER TURBIDITY, NTU | OUTPUT WATER TURBIDITY, NTU |
|---|---|---|---|---|---|---|---|---|
| Feldspar | 0.15-0.45 | 2 | 47 | 9 | 87 | 50 | <2 | <2 |
| Polystyrene Gel | 0.3-1.2 | 2 | 47 | 47 | 0 | 50 | <2 | 100 |
| Polystyrene Gel | 0.3-1.2 | 2 | 47 | 47 | 0 | 100 | <2 | 100 |

The invention claimed is:

1. An aqueous liquid filtering apparatus comprising:
   an inlet configured to stream an aqueous liquid;
   an outlet configured to stream the aqueous liquid;
   a filtration chamber comprising an inlet opening;
      wherein the inlet opening is located near a bottom of the filtration chamber, in fluid communication with the inlet, and
      wherein an outlet opening is located near a top of the filtration chamber, in fluid communication with the outlet;
   a first dosing unit located upstream of the filtration chamber configured to release water-soluble components into a stream of aqueous liquid that flows from the inlet to the filtration chamber;
   a screen covering the outlet opening of the filtration chamber;
   a particulate filter media configured to partially fill an interior of the filtration chamber, the particulate filter media being comprises inorganic material, having a mass weighted average particle size between 100 and 900 microns, and having a specific gravity of 2 to 3 g/ml;
   a flow regulator configured to regulate a flow rate of aqueous liquid through the filtration chamber,
      wherein the flow regulator can operate in either a high flow rate mode or a reduced flow rate mode; and
   a timer configured to control the flow regulator;
      wherein the timer is programmed to alternatingly switch the flow regulator from the high flow rate mode to the reduced flow rate mode after a time period reaches a first predetermined time period, $t_1$, that is in the range of 30 to 3000 seconds, and
      wherein the timer is programmed to alternatingly switch the flow regulator from the reduced flow rate mode to the high flow rate mode after a time period reaches a second predetermined time period, $t_2$, that is in the range of 1 to 10 seconds.

2. The apparatus according to claim 1, wherein the particulate filter media fills 10 to 80% of an internal volume of the filtration chamber under the influence of gravity.

3. The apparatus according to claim 1, wherein the apparatus comprises coupling means configured to attach the apparatus to a water tap so that tap water can enter the apparatus through the inlet.

4. The apparatus according to claim 1, wherein screen covering the outlet opening of the filtration chamber has a mesh size in the range of 30 to 200 microns.

5. The apparatus according to claim 4, wherein the apparatus comprises a second dosing unit located downstream of the filtration chamber,
   wherein the dosing unit is adapted to release water-soluble components into the stream of aqueous liquid that flows from the filtration chamber to the outlet,
   wherein the water-soluble components are selected from the group consisting of acidulants, fragrances, silicones, bactericides, and combinations thereof.

6. The apparatus according to claim 1, wherein the particulate filter media has a density of 2.2 to 2.9 g/ml.

7. A method of filtering aqueous liquid comprising passing the aqueous liquid through an apparatus according to claim 1 said method comprising:
   an alternating sequence of steps a and b:
      a. during a time interval $t_1$, passing a stream of aqueous liquid with a high flow rate in an upward direction through a filtration chamber comprises a filter bed and the filter bed is partially filled with particulate filter media, the stream entering the filtration chamber through an opening near a bottom of the filtration chamber and leaving the filtration chamber near a top of the filtration chamber through an opening that is covered by a screen;

the high flow rate causing the formation of a filter bed of particulate filter media against the screen;

the filter bed taking up 10 to 80% of an internal volume of the filtration chamber;

said particulate filter media of comprises inorganic material having a mass weighted average particle size between 100 and 900 microns, and having a specific gravity of 2 to 3 g/ml; and b. during a time interval $t_2$, reducing the flow rate of a stream of aqueous liquid to a sufficiently low flow rate to cause the filter bed of particulate filter media to break up and move from the screen towards the bottom of the filtration chamber;

wherein a sequestering agent that forms a water insoluble complex with $Ca^{2+}$ is added to the stream of aqueous liquid water before it reaches the filter bed of particulate filter media, wherein the time interval $t_1$ is in the range of 30 to 3000 seconds, and wherein the time interval $t_2$ is in the range of 1 to 10 seconds.

8. The method according to claim 7, wherein the sequestering agent is selected from the group consisting of sodium carbonate, potassium carbonate and combinations thereof.

9. The method according to claim 7, wherein the sequestering agent is sodium carbonate and the sodium carbonate is added to the stream of aqueous liquid in a concentration of 0.1 to 3 g/l.

10. The method according to claim 7, wherein the high flow rate employed in step a exceeds 0.3 cm/s.

11. The method according to claim 7, wherein the reduced flow rate employed in step b does not exceed 50% of the high flow rate employed in step a.

12. The method according to claim 7, wherein $t_1 : t_2 \geq 10:1$.

* * * * *